US011021979B2

(12) United States Patent
Quennehen et al.

(10) Patent No.: US 11,021,979 B2
(45) Date of Patent: Jun. 1, 2021

(54) SECTOR OF AN ANNULAR NOZZLE OF A TURBINE OF A TURBOMACHINE

(71) Applicant: SAFRAN AIRCRAFT ENGINES, Paris (FR)

(72) Inventors: Lucien Henri Jacques Quennehen, Moissy-Cramayel (FR); Sébastien Serge Francis Congratel, Moissy-Cramayel (FR); Antoine Claude Michel Etienne Danis, Moissy-Cramayel (FR); Clément Jarrossay, Moissy-Cramayel (FR); Nicolas Paul Tableau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 102 days.

(21) Appl. No.: 16/110,255

(22) Filed: Aug. 23, 2018

(65) Prior Publication Data

US 2019/0063244 A1    Feb. 28, 2019

(30) Foreign Application Priority Data

Aug. 30, 2017    (FR) ...................................... 1758011

(51) Int. Cl.
*F01D 9/04* (2006.01)
*F01D 11/00* (2006.01)
(Continued)

(52) U.S. Cl.
CPC ............ *F01D 9/041* (2013.01); *F01D 11/005* (2013.01); *F01D 11/08* (2013.01); *F01D 25/246* (2013.01);
(Continued)

(58) Field of Classification Search
CPC ........ F01D 9/041; F01D 11/005; F01D 11/08; F01D 25/246; F01D 9/04; F01D 9/042;
(Continued)

(56) References Cited

U.S. PATENT DOCUMENTS 5,104,287 A     4/1992  Ciokajlo
5,997,247 A *  12/1999  Arraitz ................. F01D 11/005
                                                    277/543
(Continued)

FOREIGN PATENT DOCUMENTS

EP    0974734 A2    1/2000
FR    2651831 A1    3/1991
FR    2872870 A1    1/2006

OTHER PUBLICATIONS

Rapport de Recherche Preliminaire, dated Apr. 24, 2018, issued in corresponding French Application No. 1758011 filed Aug. 30, 2017, 2 pages.

*Primary Examiner* — Michael Lebentritt
*Assistant Examiner* — Eric J Zamora Alvarez
(74) *Attorney, Agent, or Firm* — Christensen O'Connor Johnson Kindness PLLC

(57) ABSTRACT

A sector of a sectorized annular nozzle of a turbine of a turbomachine comprises an outer platform having an outer wall connected to a coaxial inner wall via at least one straightening fixed blade. The outer platform includes hooking means that hook the outer platform to a turbine fixed casing. The outer platform includes an outer circular shell, axially offset with respect to the outer wall and integrally formed with the outer wall, and the outer shell is intended to surround an angular portion of a rotor wheel. The hooking means includes an upstream circular edge and a downstream circular edge extending axially, said upstream and downstream edges being respectively configured to attach to an upstream hook and a downstream hook of said turbine
(Continued)

casing, and said upstream and downstream edges being oriented in the downstream direction.

11 Claims, 1 Drawing Sheet

(51) Int. Cl.
*F01D 25/24* (2006.01)
*F01D 11/08* (2006.01)

(52) U.S. Cl.
CPC .... *F05D 2220/32* (2013.01); *F05D 2220/323* (2013.01); *F05D 2240/11* (2013.01); *F05D 2240/128* (2013.01); *F05D 2240/55* (2013.01); *F05D 2240/57* (2013.01); *F05D 2300/6033* (2013.01)

(58) Field of Classification Search
CPC ........ F01D 11/008; F01D 5/143; F01D 25/24; F01D 5/225; F01D 5/282; F01D 9/00; F05D 2220/32; F05D 2220/323; F05D 2240/11; F05D 2240/128; F05D 2240/55; F05D 2240/57; F05D 2300/6033; F05D 2230/642; F05D 2260/30; F04D 29/083; F04D 29/44
See application file for complete search history.

(56) References Cited

U.S. PATENT DOCUMENTS

| | | | |
|---|---|---|---|
| 7,665,958 B2* | 2/2010 | Khanin | ................ F01D 25/246 415/134 |
| 2006/0005529 A1 | 1/2006 | Penda et al. | |
| 2009/0185899 A1 | 7/2009 | Bouchard et al. | |
| 2014/0341728 A1* | 11/2014 | Cloarec | ................... F04D 29/44 415/207 |
| 2017/0022842 A1* | 1/2017 | Spangler | ................ F01D 25/12 |

* cited by examiner

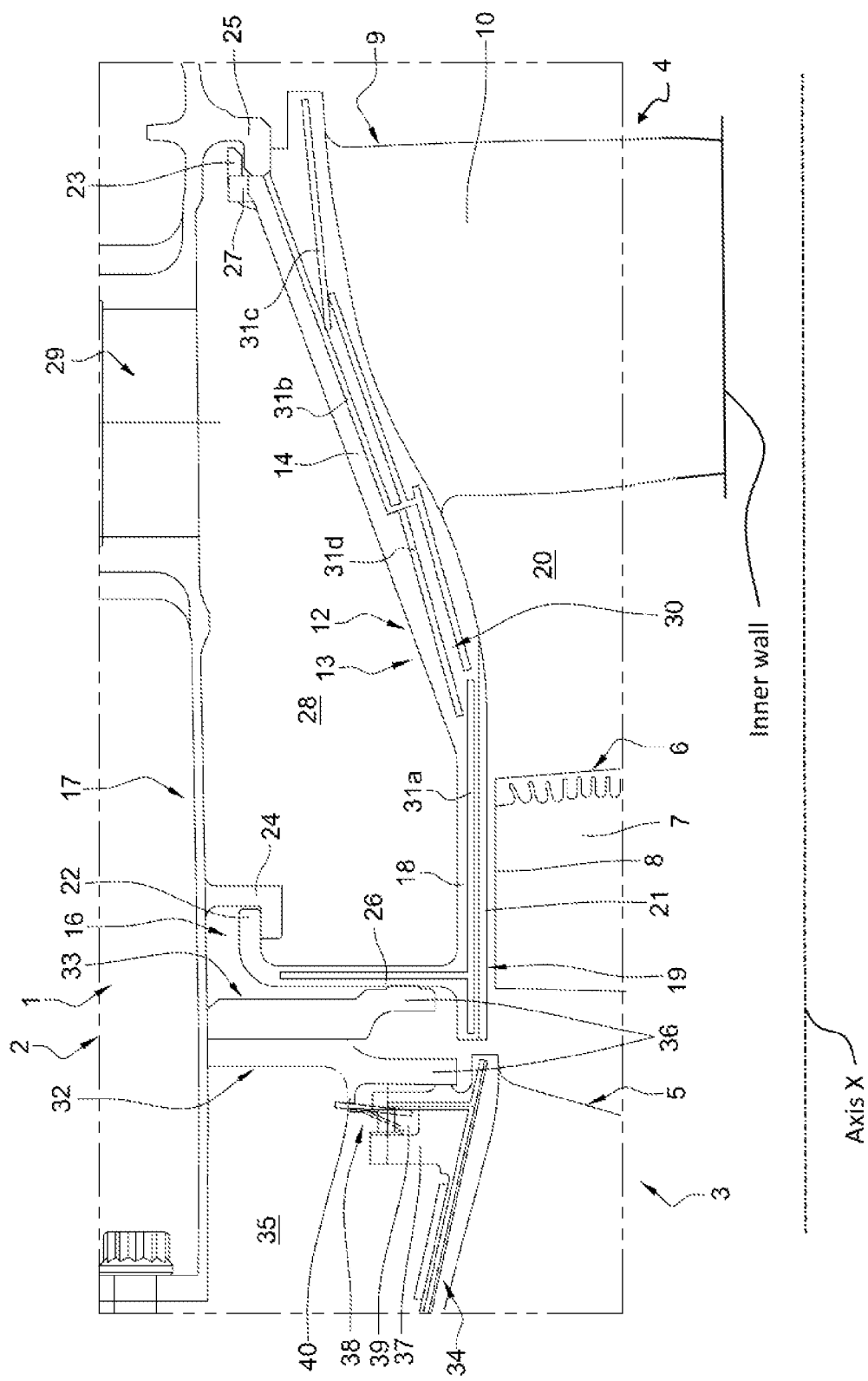

SECTOR OF AN ANNULAR NOZZLE OF A TURBINE OF A TURBOMACHINE

PRIORITY CLAIM

This application claims priority under 35 U.S.C. § 119 to French Patent Application No. 1758011, filed Aug. 30, 2017, which is herein incorporated by reference in its entirety.

TECHNICAL FIELD

Embodiments of the present disclosure relate to the field of turbomachines, such as an aircraft turbojet or turboprop, and more particularly to the nozzle of a turbine of this type of turbomachine.

BACKGROUND

A turbine of a turbomachine comprises at least one stage comprising a sectorized annular nozzle presenting a row of straightening fixed blades and a rotationally-mobile rotor wheel (also called blade wheel), the rotor wheel being mounted downstream from the nozzle in an outer, cylindrical and sectorized ring.

More precisely, the nozzle comprises two coaxial rotation walls, respectively an inner and an outer wall, between which extend the straightening fixed blades. The outer wall and the inner wall define a portion of a duct. The outer wall of the nozzle comprises hooking means to a turbine fixed casing.

The ring surrounds the rotor wheel with a suitable operating clearance, so as to avoid friction with the outer ends of the blades of the rotor wheel, while maximizing the yield of the turbine. The outer ring is generally secured to the turbine casing via an annular support placed radially between the ring and the turbine casing. The support comprises at its outer end a mounting flange to the turbine casing. The outer ring comprises hooking means to the annular support.

The turbine casing defines respectively with the outer wall of a nozzle and with the ring, different annular chambers for the cooling of the nozzles and rings, these annular chambers surrounding the duct and being generally supplied with ventilation and cooling air from the compressors of the turbomachine.

Sealing means (strips for example) are furthermore especially placed between the sectors of the nozzle and the sectors of the ring. These sealing means are provided to limit radial gas leaks from the duct towards the chambers and vice versa.

Despite the presence of such sealing means, one can acknowledge obvious radial gas leaks significantly reducing the yield of the turbine. The significance of these leaks is rated by determining especially at each leak, the parameter "W25" corresponding to the quotient of the mass flow of the leak and the mass flow in the duct.

SUMMARY

Embodiments of the present disclosure aim to provide to reduce radial gas leaks from the duct towards the chambers and vice versa, thereby increasing the performance of the turbine.

In one aspect, the present disclosure provides a sectorized annular nozzle of a turbine of a turbomachine comprising an outer platform comprising an outer wall connected to a coaxial inner wall with the outer wall via at least one straightening fixed blade, the outer platform comprising hooking means that hook the outer platform to the turbine fixed casing, wherein the outer platform comprises an outer circular shell axially offset with respect to the outer wall and integrally formed with the outer wall, and wherein the outer shell is intended to surround an annular portion of a rotor wheel, the hooking means comprising a upstream circular edge and a downstream circular edge extending axially, the upstream and downstream edges being respectively configured to attach to an upstream hook and a downstream hook of the turbine casing, the upstream and downstream edges being oriented in the downstream direction.

In another aspect, an outer platform intended to surround an angular portion of a rotor wheel comprises a portion that is intended to extend at the junction between the blades of the nozzle and the blades of the rotor wheel, which enables to reduce radial gas leaks at the level of this junction, and consequently to increase the performance of the turbine, and more generally of the turbomachine.

In another aspect, such a sector no longer requires the use of intermediate parts (such as the annular support presented in the prior art) to secure the sectors to the turbine casing, for the benefit especially of the simplicity of assembly, the weight and compactness of the turbine.

Furthermore, orienting the upstream and downstream edges in the same direction makes it easier to mount the nozzle in the casing. Indeed, in the case where the edges are oriented in opposite directions, the casing must comprise two separate parts for the assembly of the nozzle, or the nozzle must be able to undergo deformations during assembly operations. Orienting the edges in the same direction makes it easy to mount the nozzle in the casing by radial and then axial insertion.

Finally, orienting the upstream and downstream edges in the downstream direction makes it possible to take up more efficiently the aerodynamic forces applied to the nozzle by maximizing the contact surface between the edges of the nozzle and the hooks of the casing when the nozzle is subject to the aerodynamic forces.

Advantageously, the outer platform comprises, in some embodiments, an upstream circular collar and a downstream circular collar extending radially towards the outside, the upstream and downstream axial edges being respectively secured to the upstream and downstream collars, the upstream and downstream axial edges being respectively placed at the radially outer end of the upstream and downstream collars, the upstream and downstream axial edges being respectively integrally formed with the upstream and downstream collars.

Such a configuration of the edges allows, for example, for an efficient recovery of the loads by the nozzle and thereby contributes to limiting the leaks by ensuring that the parts remain in position.

In another aspect, the present disclosure provides a sectorized annular nozzle of a turbine of a turbomachine comprising a plurality of sectors of a nozzle as previously described, the sectors being end-to-end circumferentially arranged, the outer shells of the outer platforms of the sectors of the nozzle defining an outer ring intended to surround the rotor wheel.

The nozzle according to the disclosure can comprise, in some embodiments, one or several of the following characteristics, taken individually or in combination with each other:

the nozzle comprises sealing means that extend circumferentially between two joined sectors of the nozzle;

the sealing means comprise at least a first sealing lip that extends axially into two outer shells, and at least a second sealing lip that extends axially into two outer walls;

the sealing means comprise at least one central sealing lip that extends axially into two outer platforms between the outer wall and the outer shell of the two outer platforms;

at least a first and/or a second sealing lip overlaps with the at least one central lip, at least partially in a radial direction.

In another aspect, the present disclosure provides a turbine of a turbomachine comprising a nozzle as previously described, and a rotor wheel mounted inside the sectorized outer ring of the nozzle, the turbine further comprising a turbine casing to which the nozzle is attached.

In another aspect, the present disclosure provides a turbomachine comprising a turbine as previously described.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein the FIGURE shows a longitudinal cross-section view of a turbine of a turbomachine.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number.

The FIGURE shows a non-limiting embodiment that comprises a part of a turbine 1 of a turbomachine 2, such as a turbojet or a turboprop of an aircraft, the turbine 1 being arranged downstream of a combustion chamber with respect to the direction of flow of gases within the turbomachine 2.

The turbine 1 comprises an upstream turbine commonly called "high pressure turbine", comprising here a single high pressure stage 3, and a downstream turbine, partially shown, commonly called "low pressure turbine" comprising here several low pressure stages 4. Only one low pressure stage 4 is shown in the FIGURE.

More precisely, the high pressure stage 3 comprises a high pressure sectorized annular nozzle 5 presenting a row of straightening fixed blades and a high pressure rotor wheel 6 rotationally mobile around a motor axis X, the high pressure rotor wheel 6 being mounted downstream from the high pressure nozzle 5. The high pressure rotor wheel 6 comprises a plurality of blades 7, each of which presents an outer end 8.

In the same way, the low pressure stage 4 comprises a low pressure sectorized annular nozzle 9 presenting a row of straightening fixed blades 10 and a low pressure rotor wheel (not shown) rotationally mobile around the axis X, the low pressure rotor wheel being mounted downstream of the low pressure nozzle 9.

By convention in the present application, the term "axial" or "axially" describes any direction parallel to the axis X, and the term "radial" or "radially" means any direction perpendicular to the axis X. Likewise, by convention in the present application, the terms "inner", "outer", "inside", or "outside" are defined radially with respect to the axis X. Finally, the terms "upstream" and "downstream" are defined with respect to the direction of circulation of the gases within the turbomachine 2.

The low pressure nozzle 9 of the turbine 1 comprises a plurality of sectors 12 arranged circumferentially end-to-end around the axis X.

In some embodiments, each sector 12 of the low pressure nozzle 9 comprises an outer platform 13 comprising an outer wall 14 connected to a coaxial inner wall (not shown) with the outer wall 14 via at least one straightening fixed blade 10 substantially radial (for example three), the outer platform 13 comprising hooking means 16 to a turbine fixed casing 17. In some embodiments, the outer platform 13 further comprises an outer circular shell 18 axially offset in the upstream direction with respect to the outer wall 14 and integrally formed with the latter, the outer shell 18 being configured to surround an angular portion of the high pressure rotor wheel 6.

All the outer shells 18 of the outer platforms 13 of the sectors 12 of the low pressure nozzle 9 define an outer ring 19 in which is mounted the high pressure rotor wheel 6 of the high pressure stage 3.

The non-limiting example illustrated in the FIGURE is in no way limiting, the low pressure nozzle 9 presented above could be a high pressure nozzle. Furthermore, the outer ring 19 of the nozzle shown above could be configured to surround the rotor wheel of the same stage as the nozzle. In such a case, the outer shell 18 would be axially offset downstream relative to the outer wall 14.

The inner wall and the outer platform 13 define a portion of a duct 20 through which the gas flows.

According to the non-limiting embodiment shown in the FIGURE, the outer wall 14 is frustoconical and widens in the upstream to downstream direction. The outer shell 18 (respectively the outer ring 19) is cylindrical and presents a cylindrical inner surface 21 centered on the axis X. The outer ends 8 of the blades 7 of the high pressure rotor wheel 6 are facing the cylindrical inner surface 21. The cylindrical inner surface 21 surrounds the outer ends 8 of the blades 7 of the high pressure rotor wheel 6 with a radial operating clearance that is predetermined to maximize yield while limiting friction. The outer wall 14 presents a thickness (measured in the radial direction, i.e., perpendicular to the axis X) greater than that of the outer shell 18.

According to the non-limiting embodiment shown in the FIGURE, the hooking means 16 comprise an upstream circular edge 22 and a downstream circular edge 23 extending axially, the upstream and downstream edges 22, 23 being respectively configured to attach to an upstream hook 24 and a downstream hook 25 of the turbine casing 17.

Each upstream edge 22 presents a cylindrical inner bearing surface with a cylindrical outer face of the upstream hook 24. In the same way, each downstream edge 23 presents a cylindrical inner bearing surface with a cylindrical outer face of the downstream hook 25. The upstream and downstream hooks 24, 25 extend radially inwards and are oriented in the upstream direction. The upstream and downstream hooks 24, 25 are integrally formed with the turbine casing 17, but could be reported via attachment means such as bolts.

Such an orientation of the edges 22, 23 and of the hooks 24, 25 allows in operation to better take the forces exerted by the gases and limits gas leaks.

When the turbomachine 2 is in operation, under the effect of the gases an outer cylindrical shoulder of the outer platform 13 comes to bear against a cylindrical inner face of the downstream hook 25, the shoulder being placed facing the inner surface of the downstream edge 23.

In some embodiments, the outer platform 13 comprises an upstream circular collar 26 and a downstream circular collar 27 extending radially towards the outside. The upstream collar 26 protrudes from the outer platform 13 near the upstream end of the outer platform 13. The downstream collar 27 protrudes from the outer platform 13 at the level of the downstream end of the outer platform 13. The upstream and downstream axial edges 22, 23 are respectively placed at the radially outer end of the upstream and downstream collars 26, 27. The upstream and downstream edges 22, 23 are oriented downstream. The upstream and downstream edges 22, 23 are respectively integrally formed with the upstream and downstream collars 26, 27, but they could be reported via attachment means such as bolts.

The axial support of the collar 27 on the hook 25 makes it possible to prevent any axial displacements of the low pressure nozzle 9 when the latter is subject to axial forces generated by the gases present in the duct 20.

As shown in the non-limiting embodiment of the FIGURE, the turbine 1 comprises an annular chamber 28 of axis X for the cooling of the hooks 24, 25 and the collars 26, 27. The cooling of the hooks 24, 25 and of the collars 26, 27 enable especially to maintain an optimized operating clearance between the high pressure rotor wheel 6 and the outer ring 19. The chamber 28 is delimited inside by the outer platforms 13 and outside by the turbine casing 17. Furthermore, the chamber 28 is delimited upstream by the upstream collars 26 and the upstream hook 24, and downstream by the downstream collars 27 and the downstream hook 25. The chamber 28 is supplied with cooling and ventilation air via a supply duct 29 opening into the chamber 28 and formed integrally with the turbine casing 17. The cooling and ventilation air comes, for example, from compressors placed upstream from the combustion chamber with respect to the direction of flow of gases in the turbomachine 2.

In some embodiments, the low pressure nozzle 9 comprises sealing means 30 that extend circumferentially between two joined nozzle sectors 12; these sealing means 30 enable to limit radial gas leaks from the duct 20 towards the chamber 28, and vice versa, thereby improving the yield of the turbine 1.

As shown in the non-limiting embodiment shown in the FIGURE, these sealing means 30 comprise sealing lips 31a, 31b, 31c, 31d that extend circumferentially between two joined nozzle sectors 12 at the level of the outer platform 13.

More precisely, these sealing means 30 comprise an upstream sealing lip 31a extending axially in the outer shells 18 and two downstream sealing lips 31b, 31c extending in the outer walls 14.

The upstream lip 31a comprises an axial portion extending in the outer shells 18, and a radial portion that extending in the upstream collars 26. A first downstream lip 31b is inclined in the direction of the outer walls 14, the first downstream lip 31b comprising a core from which extend an inner branch oriented upstream and two outer branches oriented downstream. A second downstream lip 31c extends axially, this second downstream lip 31c comprising an upstream end placed between the two outer branches, and a second end located near the downstream end of the outer platforms 13.

The sealing means 30 comprise a central sealing lip 31d extending axially into the outer platforms 13 between the outer walls 14 and the outer shells 18 of the outer platforms 13. The central lip 31d partially overlaps the upstream sealing lip 31a and the first downstream lip 31b in the radial direction.

As shown in the non-limiting embodiment shown in the FIGURE, the turbine 1 comprises an upstream annular flange 32 and a downstream annular flange 33 between an outer ring gear 34 of the high pressure nozzle 5 and the outer platform 13 of the low pressure nozzle 9. The turbine 1 comprises an annular cavity 35 along of axis X for the cooling of the outer ring gear 34 of the high pressure nozzle 5. The cavity 35 is delimited inside by the outer ring gear 34 and outside by the turbine casing. Furthermore, the cavity 35 is delimited downstream by the upstream flange 32.

The blades of the high pressure nozzle 5 can be radially pierced so that the cooling air of the cavity 35 penetrates inside the blades.

The upstream and downstream flanges 32, 33 present an outer diameter that is slightly greater than the inner diameter of the turbine casing 17 so as to have a radial shrink and thus ensure a good seal. The upstream and downstream flanges 32, 33 are axially bearing against one another under the action of the high pressure nozzle 5. The upstream and downstream flanges 32, 33 both comprise a recess 36 respectively oriented upstream and downstream. The upstream face of the recess 36 of the upstream flange 32 bears axially with a radial ridge 37 of the outer ring gear 34. The downstream face of the recess 36 of the downstream flange 33 bears axially with the upstream collars 26 of the outer platforms 13. All of these contacts ensure proper sealing. Sealing means 38 are furthermore placed in an annular groove 39 of the ridge 37, these sealing means 38 bearing on a claw 40 protruding axially upstream from the recess 36 of the upstream flange 32. Such an arrangement makes it possible to limit radial gas leaks from the duct 20 towards the chamber 28 and the cavity 35 and vice versa, thereby improving the yield of the turbine 1. The upstream and downstream flanges 32, 33 are sectorized.

Advantageously, each sector 12 of the low pressure nozzle 9 is made of ceramic matrix composite (CMC), namely a material comprising a ceramic matrix and ceramic fibers. The matrix is for example made of carbon or of silicon carbide. The matrix is for example deposited on a preform of ceramic fibers via a melt infiltration (MI) process (by the liquid route after consolidation by gaseous means) or via a chemical deposit in the vapor phase (DCV) better known by the acronym "CVD" for "Chemical Vapor Deposition".

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A turbine nozzle sector, comprising:
   an outer platform comprising hooking means that hook the outer platform to a turbine casing;
   wherein the outer platform comprises an outer wall connected to a coaxial inner wall via at least one straightening fixed blade,
   wherein the outer platform comprises an outer circular shell, axially offset with respect to the outer wall and integrally formed with the outer wall, and wherein said outer circular shell faces an angular sector of a rotor wheel, the hooking means comprising an upstream circular ledge and a downstream circular ledge extending axially, said circular upstream and downstream ledges being respectively configured to attach to an upstream hook and a downstream hook of said turbine casing, said circular upstream and downstream ledges being oriented and protruding in a downstream direction.

2. The turbine nozzle sector according to claim 1, wherein said outer platform comprises an upstream circular collar and a downstream circular collar extending radially towards an outside, said circular upstream and downstream ledges being respectively secured to said upstream and downstream collars, the circular upstream and downstream ledges being respectively placed at a radially outer end of the upstream and downstream collars, the circular upstream and downstream ledges being respectively integrally formed with said upstream and downstream collars.

3. A sectorized annular turbine nozzle comprising a plurality of turbine nozzle sectors according to claim 1, wherein the plurality of turbine nozzle sectors are end-to-end circumferentially arranged, wherein outer shells of the outer platforms of the turbine nozzle sectors define an outer ring that faces the rotor wheel.

4. The sectorized annular turbine nozzle according to claim 3, further comprising sealing means that extend circumferentially between two joined turbine nozzle sectors of the sectorized annular turbine nozzle.

5. The sectorized annular turbine nozzle according to claim 4, wherein said sealing means comprise at least a first sealing lip that extends axially into two outer shells, and at least a second sealing lip that extends axially into two outer walls.

6. The sectorized annular turbine nozzle according to claim 5, wherein said sealing means comprise at least one central sealing lip that extends axially into two outer platforms between the outer wall and the outer shell of the two outer platforms.

7. The sectorized annular turbine nozzle according to claim 6, wherein at least one of the first sealing lip and the second sealing lip overlap with the at least one central lip, at least partially in a radial direction.

8. A turbine of a turbomachine, comprising the sectorized annular turbine nozzle according to claim 3, and the rotor wheel mounted inside said outer ring of said sectorized annular turbine nozzle, the turbine further comprising the turbine casing to which said sectorized annular turbine nozzle is attached.

9. A turbomachine comprising the turbine according to claim 8.

10. The sectorized annular turbine nozzle according to claim 3, further comprising at least one seal that extends circumferentially between two joined sectors of the sectorized annular turbine nozzle.

11. An apparatus, comprising:
    an outer platform comprising a plurality of hooks that couples the outer platform to a turbine fixed casing, the plurality of hooks comprising an upstream circular ledge and a downstream circular ledge extending axially, the upstream and downstream circular ledges of the plurality of hooks being respectively configured to attach to an upstream hook and a downstream hook of the turbine casing, the upstream and downstream circular ledges being oriented and protruding in a downstream direction,
    wherein the outer platform comprises an outer wall connected to a coaxial inner wall via at least one straightening fixed blade,
    wherein the outer platform comprises an outer shell, axially offset with respect to the outer wall and integrally formed with the outer wall, and
    wherein the outer shell faces an angular sector of a rotor wheel.

* * * * *